United States Patent
Hsu

(10) Patent No.: US 8,384,254 B2
(45) Date of Patent: Feb. 26, 2013

(54) ELECTROMAGNETICALLY-DRIVEN MECHANICAL SHUTTER AND ELECTRONIC DEVICE USING THE SAME

(75) Inventor: Hsueh-Feng Hsu, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 376 days.

(21) Appl. No.: 12/764,946

(22) Filed: Apr. 21, 2010

(65) Prior Publication Data

US 2011/0019257 A1   Jan. 27, 2011

(30) Foreign Application Priority Data

Jul. 23, 2009  (CN) .......................... 2009 1 0304709

(51) Int. Cl.
 *H02K 33/16* (2006.01)
 *H02K 35/02* (2006.01)
 *G03B 9/12* (2006.01)
 *G02B 26/02* (2006.01)

(52) U.S. Cl. ............ 310/15; 310/17; 396/463; 396/497; 359/234; 359/738

(58) Field of Classification Search .................... 310/15, 310/17, 20, 21, 49, 216.023; 396/497, 463; 359/234, 738; H02K 33/16, 35/02, 37/12, H02K 37/16, 37/18, 37/24; G03B 9/12; G02B 26/02

See application file for complete search history.

(56) References Cited

U.S. PATENT DOCUMENTS

| | | | | |
|---|---|---|---|---|
| 4,778,254 A * | 10/1988 | Gilliland et al. | ............... | 359/230 |
| 5,173,728 A * | 12/1992 | Sangregory et al. | .......... | 396/454 |
| 5,926,664 A * | 7/1999 | Taillie et al. | ................... | 396/463 |
| 6,493,513 B1 * | 12/2002 | Noguchi et al. | ............... | 396/463 |
| 2006/0267420 A1 * | 11/2006 | Naganuma et al. | ......... | 310/49 R |
| 2008/0055027 A1 * | 3/2008 | Kayama et al. | ................ | 335/222 |
| 2011/0217033 A1 * | 9/2011 | Hsu | ............................. | 396/497 |

FOREIGN PATENT DOCUMENTS

CN         1734344         2/2006
CN       200976619        11/2007

* cited by examiner

*Primary Examiner* — Tran N. Nguyen
*Assistant Examiner* — Michael Andrews
(74) *Attorney, Agent, or Firm* — Altis Law Group, Inc.

(57) ABSTRACT

A mechanical shutter includes a base including a plate with an aperture and a protruding positioning projection. A core on the surface surrounds the aperture and includes a first end and a second end. The positioning projection is arranged between the first end and the second end, on one corner of the surface. A coil surrounds the core and a blade and a permanent magnet are pivoted on the positioning projection. When receiving current, the coil magnetizes to the core to generate a magnetic force and rotates the permanent magnet, and the blade, to cover and expose the aperture. An electronic device having the mechanical shutter is also provided.

12 Claims, 5 Drawing Sheets

ELECTROMAGNETICALLY-DRIVEN MECHANICAL SHUTTER AND ELECTRONIC DEVICE USING THE SAME

BACKGROUND

1. Technical Field

The present disclosure relates to image-capturing devices and, particularly, to a mechanical shutter and electronic device using the mechanical shutter.

2. Description of Related Art

A frequently used mechanical shutter includes a motor, a driving shaft, and a spring. It is, however, difficult to achieve reduction in the size of such mechanical shutters.

Therefore, it is desirable to provide a mechanical shutter to overcome the described limitations.

BRIEF DESCRIPTION OF THE DRAWINGS

The components in the drawings are not necessarily drawn to scale, the emphasis instead placed upon clearly illustrating the principles of a mechanical shutter and an electronic device using the same. Moreover, in the drawings, like reference numerals designate corresponding parts throughout the several views.

DETAILED DESCRIPTION

Figure 1:
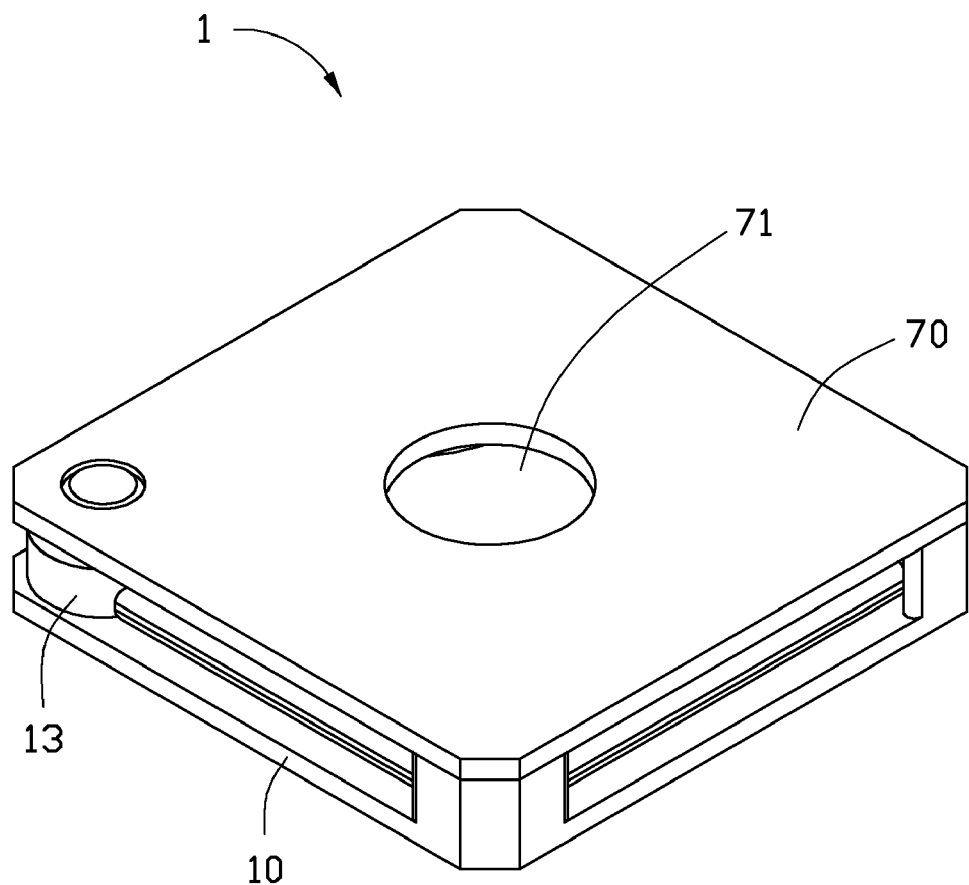
FIG. 1 is an isometric view of a mechanical shutter in accordance with an exemplary embodiment.
Figure 2:
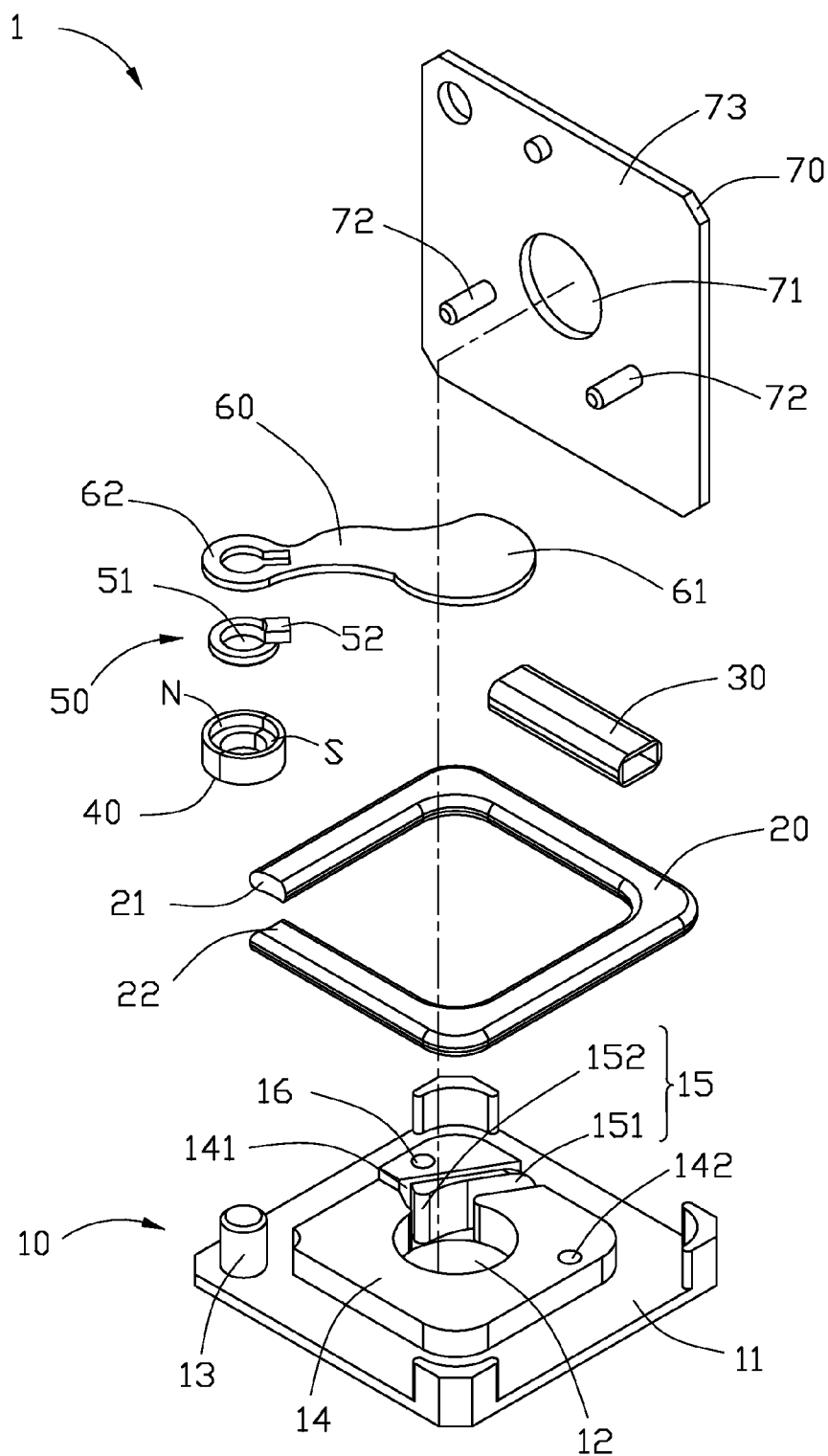
FIG. 2 is an exploded, perspective view of the mechanical shutter of FIG. 1.

Referring to FIGS. 1-2, a mechanical shutter 1 includes a base 10, a core 20, a coil 30, a permanent magnet 40, a rotary member 50, a blade 60, and a cover 70.

The base 10 includes a plate 11. In the embodiment, the plate 11 is generally square. The plate 11 defines a first aperture 12 extending through the plate 11. The core 20 is mounted on the plate 11.

A positioning block 14 protrudes from a top of the plate 11. In the embodiment, the positioning block 14 is generally square. The core 20 surrounds the positioning block 14. The positioning block 14 defines a through hole (not labeled) extending through the positioning block 14. The through hole is coaxial to the first aperture 12. The positioning block 14 further defines a gap 141 extending downwards from the top of the positioning block 14. The gap 141 communicates with the through hole. A resisting portion 15 is received in the gap 141. The resisting portion 15 includes a fixing end 151 and a free end 152. The fixing end 151 is secured to the plate 11. The free end 152 is adjacent to the through hole, and the height of the resisting portion 15 is higher than that of the positioning block 14. In the embodiment, the free end 152 prevents the blade 60 from sliding further. The positioning block 14 further defines a pair of positioning holes 142 to secure the cover 70 to the base 10.

A positioning projection 13 protrudes from the top of the plate 11 adjacent to one corner of the plate 11. In the embodiment, the positioning projection 13 is generally cylindrical. The permanent magnet 40, the rotary member 50, and the blade 60 pivot on the positioning projection 13 in sequence.

In the embodiment, the core 20 is generally square. The core 20 includes a first end 21 and a second end 22. The first end 21 and the second end 22 are spaced apart from each other. The positioning projection 13 is arranged between the first end 21 and the second end 22. The permanent magnet 40 is arranged above the core 20. The distance between the blade 60 and the top of the plate 11 exceeds the height of the positioning block 14 and is less than the height of the resisting portion 15. Thus, the blade 60 can move along the positioning block 14 and be resisted by the resisting portion 15.

The coil 30 is hollow to receive one segment or alternatively, all of the core 20. When current is introduced onto the coil 30, the first end 21 is magnetized to a north pole, and the second end 22 is magnetized to a south pole, or vice versa.

In the embodiment, the permanent magnet 40 is annular. The permanent magnet 40 includes a north pole and a south pole. The south pole of the permanent magnet 40 is adjacent to the first end 21, the north pole of the permanent magnet 40 is adjacent to the second end 22 of the core 20.

The rotary member 50 engages the permanent magnet 40. The rotary member 50 includes a ring 51 and a latching portion 52 protruding from the top of the ring 51. The ring 51 is pivoted on the positioning projection 13. The latching portion 52 secures the rotary member 50 to the blade 60. The rotary member 50 and the blade 60 rotate with the permanent magnet 40.

The blade 60 includes a light shielding portion 61 and defines a through hole 62, through which the positioning projection 13 passes. When the blade 60 rotates, the light shielding portion 61 rotates to cover the aperture 12 or expose the aperture 12 to the mechanical shutter 1. In the embodiment, the light shielding portion 61 is larger than the aperture 12.

The cover 70 defines a second aperture 71, coaxial with the first aperture 12. In the embodiment, the diameter of the second aperture 71 is generally equal to or larger than that of the first aperture 12. A pair of positioning posts 72 protrudes from the bottom surface 73. Each of the positioning posts 72 is received in one of the positioning holes 142 to secure the cover 70 to the base 10.

Accordingly, the structure of the mechanical shutter 1 is simpler than that of commonly used mechanical shutters.

Figure 3:
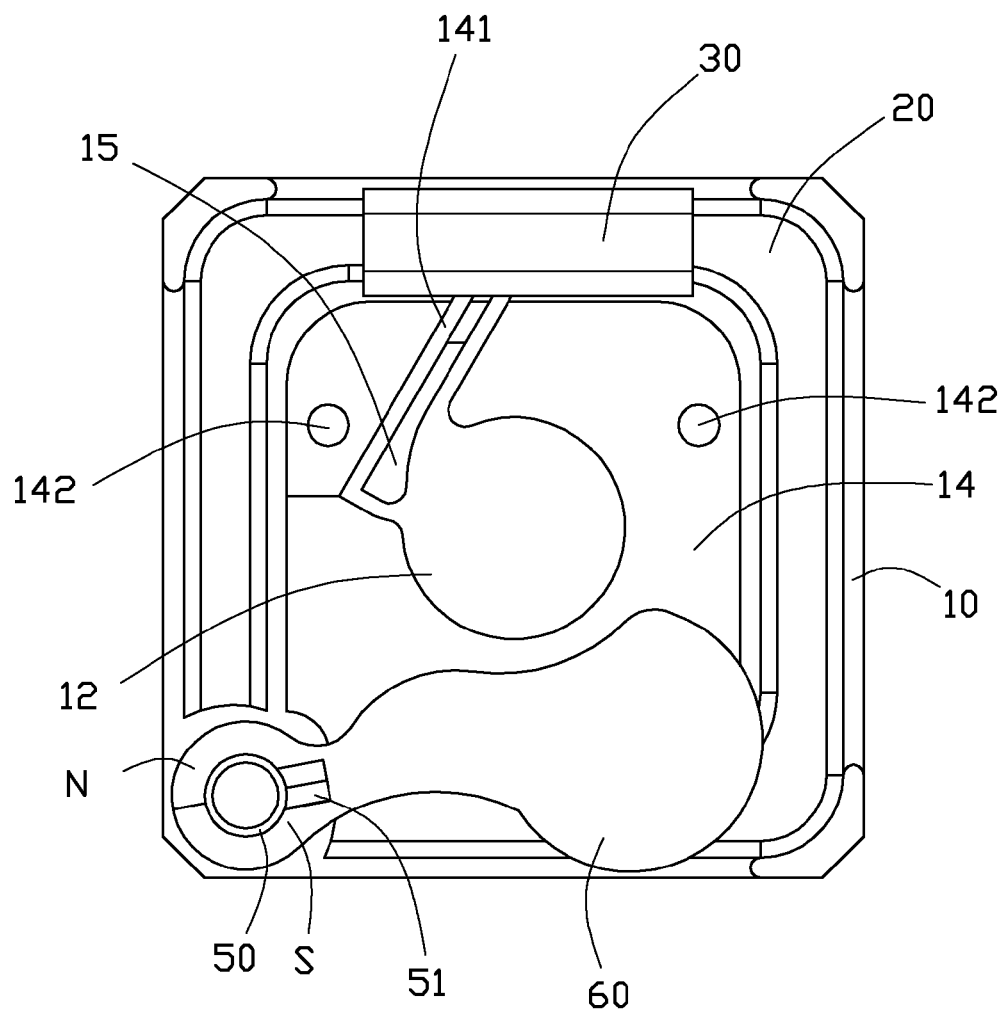
FIG. 3 is a plan view of the mechanical shutter of FIG. 1, showing an aperture of the mechanical shutter not covered by a blade of the mechanical shutter.
Figure 4:
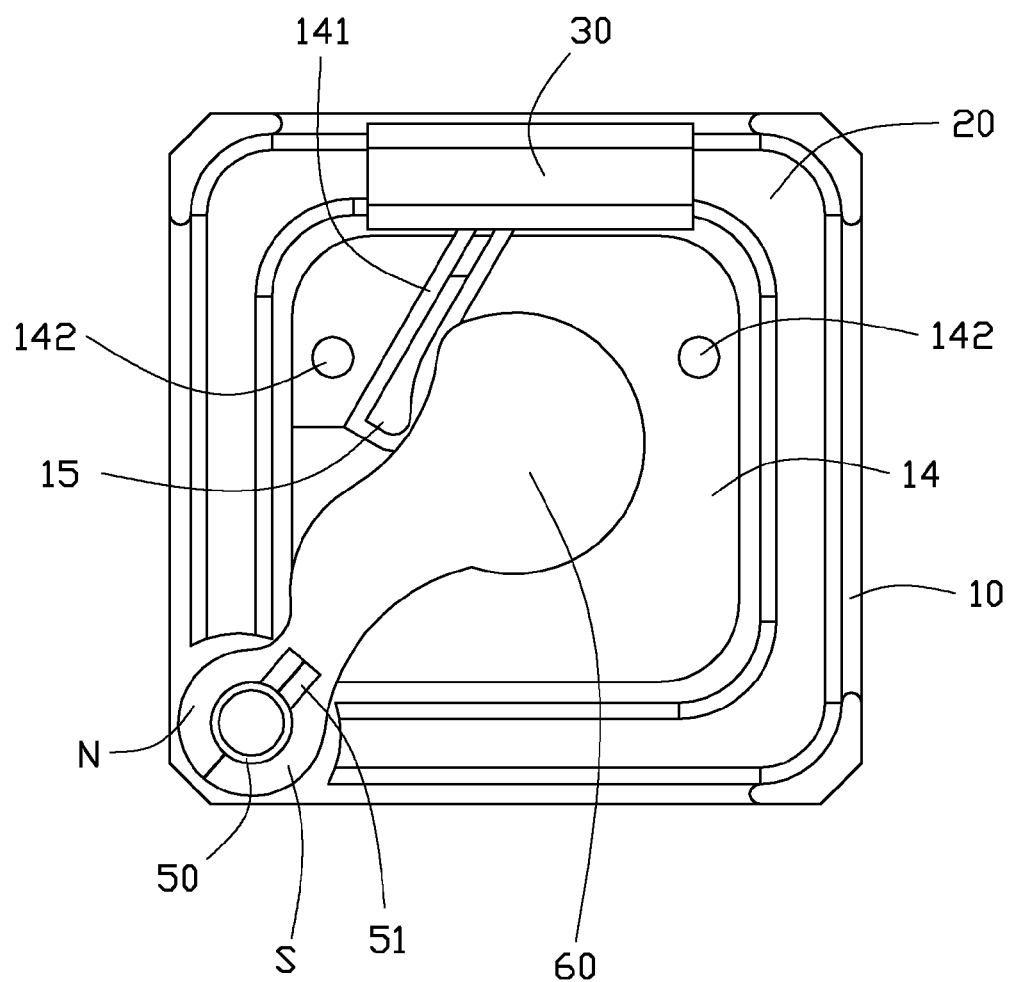
FIG. 4 is a plan view of the mechanical shutter of FIG. 1, showing the aperture covered by the blade of the mechanical shutter.

Referring also to FIGS. 3-4, after assembly, the light shielding portions 61 of the blade 60 is able to cover or expose the aperture 12.

When a first current is introduced onto the coil 30, the first end 21 of the core 20 is magnetized to the north pole, and the second end 22 of the core 20 is magnetized to the south pole. The north pole of the permanent magnet 40 and the first end 21 repel each other, and the south pole of the permanent magnet 40 and the second end 22 repel each other, thus the permanent magnet 40 rotates about the positioning projection 13, and the rotary member 50 and the blade 60 rotate with the permanent magnet 40 to move the light shielding portion 61 away from the aperture 12. When the first current on the coil 20 is stopped, the aperture 12 is exposed to the mechanical shutter 1. The south pole of the permanent magnet 40 is adjacent to the first end 21 and the north pole of the permanent magnet 40 is adjacent to the second end 22 of the core 20.

When a second current opposite to the first current is introduced onto the coil 30, the first end 21 of the core 20 is magnetized to the south pole, and the second end 22 of the core 20 is magnetized to the north pole. The north pole of the permanent magnet 40 and the first end 21 attract each other, and the south pole of the permanent magnet 40 and the second end 22 attract each other. Accordingly, the permanent magnet 40 is rotated about the positioning projection 13, and the rotary member 50 and the blade 60 rotate with the permanent magnet 40 to cause the light shielding portions 61 to cover the aperture 12. After the second current on 20 is stopped, the aperture 12 is covered by the blade 60.

Figure 5:
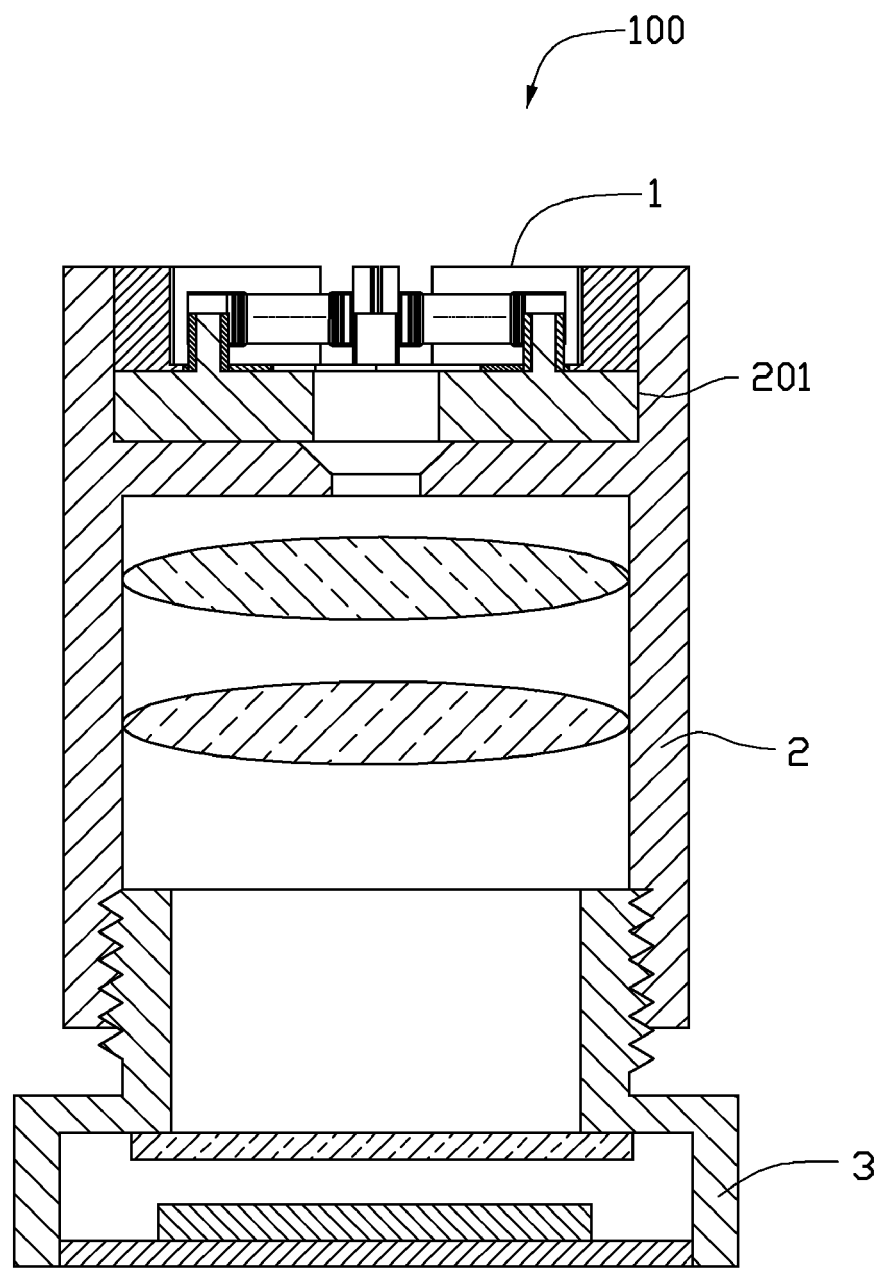
FIG. 5 is a cross-section of an electronic device in accordance with an exemplary embodiment, showing a mechanical shutter, such as, that of FIG. 1, employed therein.

Referring also to FIG. 5, an electronic device 100, as an image-capturing device, for instance, includes the mechanical shutter 1, a lens module 2, and a lens holder 3 secured to the lens module 2. The lens module 2 defines a receiving space 201 extending from the top of the receiving space to receive the mechanical shutter 1. The lens holder 3 includes a sensor (not labeled) to receive light passing through the mechanical shutter 1 and the lens module 2 to form a digital image. In an alternative embodiment, the mechanical shutter 1 is secured to different positions relative to the lens module 2. In the embodiment, the electronic device 100 is a camera. The mechanical shutter 1 controls exposure in image-taking by the electronic device 100.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely preferred or exemplary embodiments of the present disclosure.

What is claimed is:

1. A mechanical shutter, comprising:
   a base comprising a plate, the plate defining an aperture and a protruding positioning projection on a surface of the plate;
   a core arranged on the surface around the aperture comprising a first end and a second end, the positioning projection being arranged between the first end and the second end;
   a coil arranged around the core;
   a blade and a permanent magnet pivoting on the positioning projection; and
   a resisting portion, wherein the resisting portion comprises a fixing end and a free end, the fixing end is fixed on the plate, and the free end is adjacent to the aperture and prevents the blade from sliding further when the aperture is covered;
   wherein, when current is supplied to the coil, the coil magnetizes the core to generate a magnetic force to rotate the permanent magnet, which rotates the blade to cover or expose the aperture.

2. The mechanical shutter of claim 1, further comprising a rotary member pivoted on the positioning projection and received in the permanent magnet, and the rotary member secures the permanent magnet to the blade.

3. The mechanical shutter of claim 1, further comprising a cover defining a second aperture, coaxial with the first aperture.

4. The mechanical shutter of claim 3, further comprising a pair of positioning pins disposed on a bottom surface of the cover corresponding to the surface of the plate; and the base defines a pair of positioning holes corresponding to the positioning pins to assemble the cover to the base.

5. The mechanical shutter of claim 1, wherein the permanent magnet is annular and includes a north pole and a south pole.

6. The mechanical shutter of claim 1, wherein the base is square, and the positioning projection is fixed in one corner of the base.

7. An electronic device comprising a mechanical shutter, a lens module, and a lens holder secured to the lens module, the mechanical shutter comprising:
   a base comprising a plate, the plate defining a first aperture, and a positioning projection protruding from the plate;
   a core arranged on the surface around the aperture comprising a first end and a second end, the positioning projection defined between the first end and the second end;
   a coil arranged around the core;
   a blade and a permanent magnet pivoted on the positioning projection; and
   a resisting portion, wherein the resisting portion comprises a fixing end and a free end, the fixing end is fixed on the plate, the free end is adjacent to the aperture and prevents the blade from sliding further when the aperture is covered;
   wherein when current is supplied to the coil, the coil magnetizes to core to generate a magnetic force to rotate the permanent magnet, which rotates the blade to cover or expose the aperture.

8. The electronic device of claim 7, further comprising a rotary member pivoted on the positioning projection and received in the permanent magnet, and the rotary member secures the permanent magnet to the blade.

9. The electronic device of claim 7, further comprising a cover comprising a second aperture, coaxial with the first aperture.

10. The electronic device of claim 9, further comprising a pair of positioning pins disposed on the bottom surface of the cover corresponding to the surface of the plate; and the base defines a pair of positioning holes corresponding to the positioning pin to assemble the cover to the base.

11. The electronic device of claim 7, wherein the permanent magnet is annular and comprises a north pole and a south pole.

12. The electronic device of claim 7, wherein the base is square and the positioning projection is fixed in one corner of the base.

* * * * *